United States Patent [19]

Bolinger

[11] Patent Number: 4,671,363
[45] Date of Patent: Jun. 9, 1987

[54] PLOW MOLDBOARD HAVING REVERSIBLE AND INTERCHANGEABLE PARTS

[76] Inventor: Ralph L. Bolinger, R.R. #1, P.O. Box 181, Roann, Ind. 46974

[21] Appl. No.: 797,703

[22] Filed: Nov. 13, 1985

[51] Int. Cl.[4] ............................................. A01B 15/10
[52] U.S. Cl. .................................... 172/704; 172/735; 172/760
[58] Field of Search ............... 172/701.1, 701.2, 701.3, 172/702, 703, 704, 735, 736, 737, 747, 754, 756, 760, 769, 772, 772.5, 811, 815; 37/266, 267

[56] References Cited

U.S. PATENT DOCUMENTS

| | | | |
|---|---|---|---|
| 1,482 | 1/1840 | Smith | 172/704 |
| 109,250 | 11/1870 | Richardson | 172/754 |
| 171,477 | 12/1875 | Hall | 172/704 |
| 190,932 | 5/1877 | Towers | 172/772 X |
| 275,745 | 4/1883 | Anderson et al. | 172/704 |
| 420,350 | 1/1890 | Miller et al. | 172/704 |
| 520,479 | 5/1894 | Bunnell | 172/701.3 |
| 566,218 | 8/1896 | Oyler | 172/756 |
| 635,762 | 10/1899 | Ewing | 172/704 |
| 1,185,358 | 5/1916 | Williams | 172/703 |
| 1,741,933 | 12/1929 | Gunnison | 172/719 X |
| 2,471,164 | 5/1949 | Mohl | 172/754 |
| 3,199,610 | 8/1965 | Van Der Lely | 172/754 X |
| 3,850,252 | 11/1974 | Ingalls | 172/760 |

FOREIGN PATENT DOCUMENTS

| | | | |
|---|---|---|---|
| 189644 | 4/1957 | Austria | 172/701.3 |
| 2164525 | 6/1973 | Fed. Rep. of Germany | 37/266 |
| 134293 | 10/1919 | United Kingdom | 172/760 |

Primary Examiner—Richard T. Stouffer
Attorney, Agent, or Firm—Jeffers, Irish & Hoffman

[57] ABSTRACT

A plow moldboard made of a plurality of sections which are reversible and interchangeable so that each moldboard section can alternatively serve as the leading edge of the moldboard in two different positions. Each section has substantially parallel top and bottom edges and substantially parallel side edges. Each section has a uniform curvature and also has two apertures for receiving a bolt therethrough and for fastening upon the plow frame.

5 Claims, 3 Drawing Figures

PLOW MOLDBOARD HAVING REVERSIBLE AND INTERCHANGEABLE PARTS

BACKGROUND OF THE INVENTION

The invention herein is a plow moldboard which is made of a plurality of moldboard sections. The board sections are reversible and interchangeable such that each moldboard section can alternatively serve as the leading edge of the moldboard in two different positions. Whenever sufficient wear occurs on the leading edge, the leading moldboard section can be reversed in position or interchanged with another moldboard section. Whenever all the moldboard sections have sufficiently worn, they can be replaced by new moldboard sections. Thereafter, the reversing and interchanging of each moldboard section can be repeated.

It is known that cultivation of farm fields requires the use of a plow for tilling the soil. Further, plows are generally made of a share for cutting the soil and a moldboard for causing the soil to turn over. Plowing, however, causes the front surface near the leading edge of the moldboard to wear and make the plow substantially non-functional. The plow or the moldboard must thus be replaced. However, replacing the moldboard or the plow is generally expensive because of material and labor costs.

Accordingly, there is a need for a moldboard which can be utilized in a more efficient fashion and not simply discarded after its leading surface edge has sufficiently worn. There is a need to better utilize the materials which make up the moldboard such that the moldboard can have a longer life and the overall costs of cultivation can be decreased.

SUMMARY OF THE INVENTION

It is the principal object of this invention to overcome the above-discussed disadvantages associated with the earlier moldboards. It is also the object of the invention to provide a moldboard which is made of a plurality of interchangeable and reversible sections such that each moldboard section can alternatively serve as the leading edge of the moldboard.

In one form of the invention, the invention is directed to a moldboard for a plow having a plurality of parallel adjacent moldboard sections which are detachably mounted to the plow to form an essentially continuous moldboard surface. The moldboard sections have parallel top and bottom edges and generally parallel side edges. Further, the board sections have a uniform curvature so that each is reversible and interchangeable with another.

In another form thereof, the invention is a moldboard section for a plow having an elongate body made of a parallelogram-like configuration which has a pair of oppositely disposed longitudinal edges joined by a pair of oppositely disposed transverse edges. The elongate body has a pair of apertures by which the body can be detachably mounted to a plow in a selected one of two positions. In the first position, one of the longitudinal edges is the leading edge, and in a second position the other of the two longitudinal edges is the leading edge.

In another form thereof, the invention is directed to a plow which has a moldboard made up of a plurality of upstanding reversible elongate moldboard sections. These sections have a pair of opposite longitudinal edges and each section is independently detachably mounted to a plow frame to form a continuous moldboard surface. Each longitudinal edge of each moldboard section can selectively serve as the leading edge of the moldboard. The plow further has a horizontally disposed plowshare positioned adjacent to the bottom edge of the moldboard surface.

BRIEF DESCRIPTION OF THE DRAWINGS

The above-mentioned and other features and objects of this invention and the manner in obtaining them will become more apparent, and the invention itself will be better understood by reference to the following description of an embodiment of the invention, taken in conjunction with the accompanying drawings wherein.

Corresponding reference characters indicate corresponding parts throughout the several views of the drawings.

Figure 1:
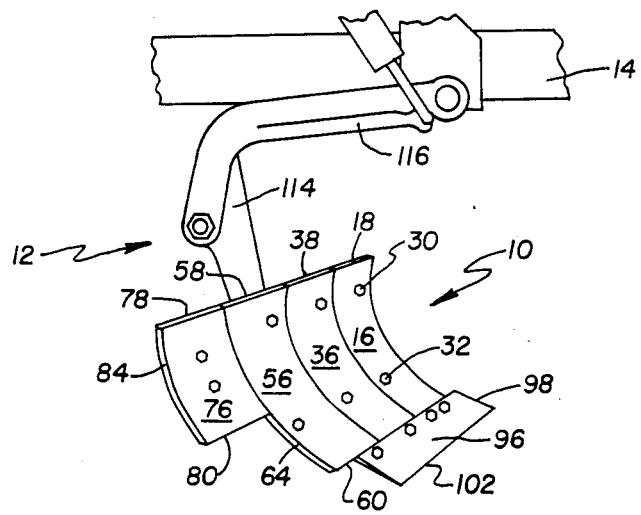
FIG. 1 is a perspective view showing the moldboard of the present invention attached to a plow frame assembly.

The exemplifications set out herein illustrate a preferred embodiment of the invention, in one form thereof, and such exemplifications are not to be construed as limiting the scope of the disclosure or the scope of the invention in any manner.

DESCRIPTION OF A SPECIFIC EMBODIMENT

As shown in the drawings, the device relates generally to plows which are used to cultivate farm land. More specifically, the device is a plow moldboard which is made of reversible and interchangeable parts. By reversing and interchanging these parts, the overall life of the moldboard is substantially increased.

Referring to FIG. 1, there is a plow frame assembly 14 upon which there is connected a frog assembly generally indicated as 12. Frog assembly 12 is connected to plow frame assembly 14 via frog elbow 116. Frog arm 114 is connected to and extends downward from frog elbow 116 for connecting thereto the moldboard support members.

Figure 2:
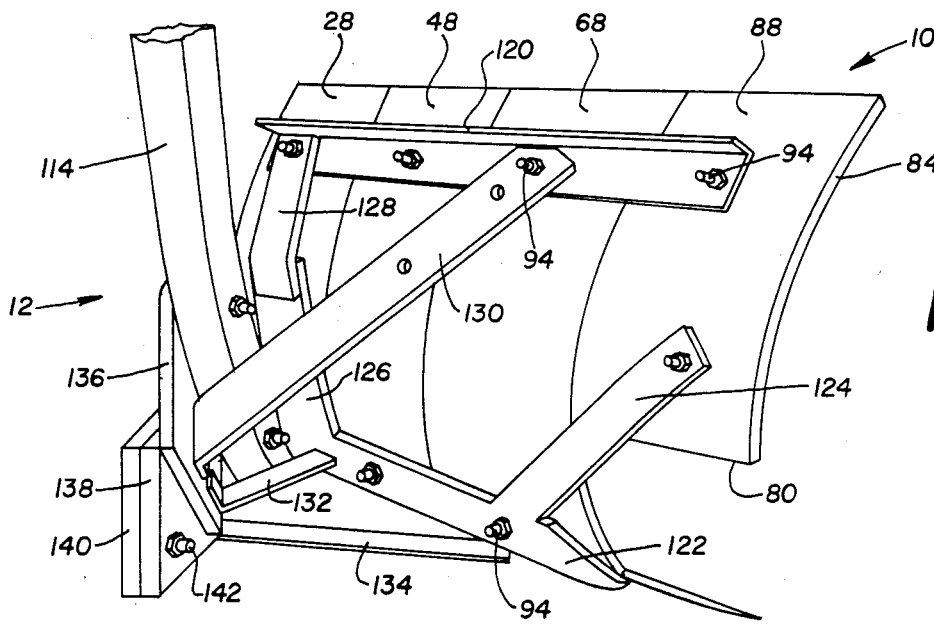
FIG. 2 is a back perspective view of the moldboard shown in FIG. 1 as assembled and supported by the frog assembly.
Figure 3:
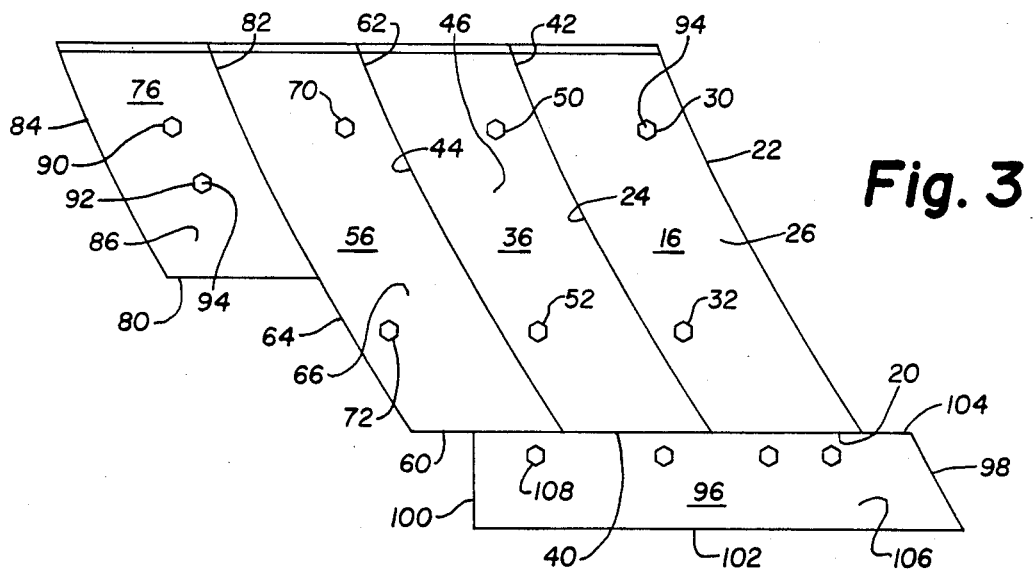
FIG. 3 is a front elevational view of the moldboard and plowshare shown in FIG. 1.

As shown in FIG. 2, frog diagonal 136 along with frog horizontals 138 and 140 are connected to arm 114 with nuts and bolts or other suitable means. Frog horizontal members 138 and 140 are connected together with nut and bolt assembly 142. Fingers 132 and 134 are welded to frog diagonal 136 and frog horizontal 138, respectively. Fingers 132 and 134 are further welded, at the other end thereof, to lower support member 122 which has integrally connected thereto outer extension 124 and inner extension 126. There is also welded upon frog diagonal 136 a finger 130 which extends forwardly and upward and is connected to upper support member 120 via bolt 94. Upper support member 120 is thus held in position by finger 130. Upper support member 120 is also held in position by inner support member 128 which is welded to lower support member inner extension 126. Inner support member 128 is bolted to the inner end of upper support member 120 via a bolt 94. Thus, the frog assembly acts to keep upper support member 120 and lower support member 122 in position such that the moldboard parts can be supported and bolted thereupon.

Moldboard 10 is made up of generally parallelogram-like arcuate board sections 16, 36 and 56, and a trailing parallelogram-like arcuate section 76. Board section 16 has a transverse upper edge 18, a lower transverse edge 20 and longitudinal edges 22 and 24. As shown, transverse edge 18 is parallel to transverse edge 20 and longitudinal edge 22 is parallel to longitudinal edge 24. Board section 36 is identical in shape to board section 16 having transverse edges 38 and 40 and longitudinal edges 42 and 44. Board section 56 is also identical in shape to board sections 16 and 36 having transverse edges 58 and 60 and longitudinal edges 62 and 64. Trailing arcuate section 76 has edges which are parallel to the board section edges and is further concave similar to the board edges. However, trailing arcuate section 76 is substantially smaller than the board sections and is thus not interchangeable with the other board sections. Trailing arcuate section 76 has transverse edges 78 and 80 and longitudinal edges 82 and 84.

Board sections 16, 36 and 56 and trailing section 76 have front concave surfaces 26, 46, 66 and 86, respectively. Board sections 16, 36 and 56 and trailing arcuate section 76 also have, as shown in FIG. 2, back convex surfaces 28, 48, 68 and 88 respectively. The board sections and the trailing section can be made of steel such that the front concave surfaces can retain a low coefficient friction so that the soil being turned over will not stick thereto. It should be noted that the board sections and the trailing section can also be made of plastic or other suitable material which is structurely strong and can retain a low coefficient friction on the front concave surfaces thereof.

The board sections and the trailing section each have two apertures through which fits bolt 94 which in turn is used to mount said section upon upper support member 120 and lower support member 122. Board section 16 has apertures 30 and 32. Board section 36 has apertures 50 and 52. Board section 56 has apertures 70 and 72. And lastly, trailing section 76 has apertures 90 and 92. Each of said apertures is countersunk inward from the concave surfaces such that the head of bolts 94 received therein do not substantially protrude outward further than the front concave surfaces. Thus, the front concave surface of each moldboard 10 is kept substantually smooth so that the soil being turned over can easily slide thereupon.

At the bottom portion of moldboard 10 there is a share 96, typically made of steel, and connected to lower support member 122 of frog assembly 12. Share 96 has an upper edge 104 abutting the lower transverse edges 20, 40 and 60 of board sections 16, 36 and 56, respectively. Share 96 also has a back edge 100, a long horizontal cutting edge 102 and a short cutting edge 98. Cutting edges 98 and 102, during cultivation, act to cut the soil as the plow moves forward. Thereafter, the soil is forced upon the moldboard which, through its concave front surface, causes the soil to be turned over. Share 96, like the board sections and the trailing section, has a front surface 106 which also has a low coefficient friction for allowing the soil to easily slide thereover. Further, share 96 is mounted upon lower support member 122 with bolts 94 which are received in countersunk apertures 108 in the same fashion as described above with respect to the apertures in the board sections.

In operation, the moldboard generally wears mostly on the concave front surface 26 of moldboard sections 16 near leading transverse edge 22. Accordingly, after sufficient wear has occurred upon concave surface 26 near longitudinal edge 22, board section 16 can be detached, reversed, and bolted in position such that longitudinal edge 24 becomes the leading edge of the moldboard. Thus, in the reverse position, aperture 30 will take the place of aperture 32, transverse edge 18 will take the place of transverse edge 20 and longitudinal edge 24 will take the place of longitudinal edge 22.

Thereafter, after sufficient wear has occurred upon concave surface 26 near the then longitudinal edge 24, board section 16 can be detached and replaced by board sections 36 or 56. Then, the replaced section, after sufficient wear has occurred near the leading edge, can be detached and reversed as was done with board section 16. It is thus evident that a total of six wear surfaces are provided with moldboard 10 which has reversible and interchangeable board sections 16, 36 and 56. The material of the board section is therefore more efficiently utilized to increase the life of the moldboard by a factor of six. Furthermore, when the board sections have all been utilized to their full capacity, they can be replaced with new board sections and the process of reversing and interchanging and be repeated.

While the invention has been described as having a specific embodiment, it will be understood that it is capable of further modification. This application is therefore intended to cover any variations, uses or adaptations of the invention following the general principles thereof and including such departures from the present disclosure as come within known or customary practice in the art to which this invention pertains and fall within the limits of the appended claims.

What is claimed is:

1. A moldboard for a plow comprising:
   a plurality of generally parallel adjacent moldboard sections detachably mountable to a plow, said sections forming a substantially continuous moldboard surface, each one of said moldboard sections being parallelogram shaped having two interior obtuse angles and having generally parallel top and bottom edges, generally parallel side edges, and a uniform curvature so that each said moldboard section is reversible and interchangeable with another, and a generally horizontally disposed plow share positioned adjacent to the bottom edge of said moldboard surface.

2. The moldboard of claim 1 wherein each said moldboard section is independently mountable to the plow so that each said side edge can selectively serve as the leading edge of the moldboard surface.

3. A plow for use in conjunction with a plow frame comprising:
   a moldboard including a plurality of generally upstanding reversible elongate moldboard sections, each of said sections having a pair of opposite longitudinal edges and generally parallel top and bottom edges, said sections being parallelogram shaped having two interior obtuse angles and each of said moldboard sections being independently detachably mountable to the plow frame, said sections forming a substantially continuous moldboard surface wherein each said longitudinal edge of each said moldboard section selectively serves as the leading edge of the moldboard; and
   a generally horizontally disposed plowshare positioned adjacent to the bottom edge of the moldboard surface.

4. The plow of claim 3 further including a generally upstanding trailing arcuate section mountable to the plow frame adjacent to the trailing moldboard section.

5. A plow for use in conjunction with a plow frame comprising:

a moldboard having a plurality of generally parallel adjacent moldboard sections for detachably mounting to the plow frame, said sections forming a substantially continuous moldboard surface, each of said moldboard sections being parallelogram shaped having two interior obtuse angles and having generally parallel top and bottom edges, generally parallel sides and a uniform curvature so that each of said moldboard sections are reversible and interchangeable with one another;

a generally horizontally disposed plow share positioned adjacent to the bottom edge of said moldboard surface; and a generally upstanding trailing arcuate section for mounting to the plow frame adjacent to the trailing moldboard section whereby plowed soil is aided to turn over.

* * * * *